(12) United States Patent
Han et al.

(10) Patent No.: US 12,497,705 B2
(45) Date of Patent: Dec. 16, 2025

(54) DEVICE AND METHOD FOR PRODUCING HYDROGEN AND BYPRODUCT OXYGEN BY USING GREEN ELECTRICITY ELECTROLYZED WATER

(71) Applicant: HANGZHOU OXYGEN PLANT GROUP CO., LTD., Hangzhou (CN)

(72) Inventors: Yisong Han, Hangzhou (CN); Fang Tan, Hangzhou (CN); Xudong Peng, Hangzhou (CN); Lijian Lao, Hangzhou (CN); Ling Li, Hangzhou (CN); Lei Yao, Hangzhou (CN); Meifeng Ren, Hangzhou (CN); Shenjun Xu, Hangzhou (CN); Xiaoyu Xie, Hangzhou (CN)

(73) Assignee: HANGZHOU OXYGEN PLANT GROUP CO., LTD., Hangzhou (CN)

( * ) Notice: Subject to any disclaimer, the term of this patent is extended or adjusted under 35 U.S.C. 154(b) by 478 days.

(21) Appl. No.: 18/150,214

(22) Filed: Jan. 5, 2023

(65) Prior Publication Data

US 2023/0212768 A1   Jul. 6, 2023

(30) Foreign Application Priority Data

Jan. 6, 2022   (CN) .......................... 202210008248.7

(51) Int. Cl.
*C25B 15/08*  (2006.01)
*C01B 13/02*  (2006.01)
(Continued)

(52) U.S. Cl.
CPC ........ *C25B 15/083* (2021.01); *C01B 13/0237* (2013.01); *C01B 13/0248* (2013.01);
(Continued)

(58) Field of Classification Search
CPC ..... C25B 15/08; C25B 15/083; C25B 15/085; F25J 1/0017; F25J 1/0035; F25J 1/007;
(Continued)

(56) References Cited

U.S. PATENT DOCUMENTS 7,143,606 B2 * 12/2006 Tranier ................ F25J 3/04612
62/643
11,959,699 B2 * 4/2024 Molter ................... F25J 1/0279
(Continued)

*Primary Examiner* — Frantz F Jules
*Assistant Examiner* — Devon Moore
(74) *Attorney, Agent, or Firm* — Proi Intellectual Property US

(57) ABSTRACT

A device and a method for producing hydrogen and byproduct oxygen by using green electricity electrolyzed water are provided. The device comprises an oxygen purifying system, a heat exchange system, an air separation compression and expansion system, an air separation rectification system and a liquid oxygen storage system. The method comprises the following steps: first, purifying oxygen prepared by electrolyzing water by green electricity to remove impurities such as hydrogen, carbon monoxide, carbon dioxide and water in the oxygen, then feeding the pure oxygen into the heat exchange system, performing heat exchange liquefaction to obtain liquid oxygen, coupling the liquid oxygen generated by rectification of the air separation rectification system, and obtaining pressurized oxygen through the heat exchange system and the air separation compression and expansion system.

1 Claim, 2 Drawing Sheets

(51) Int. Cl.
*C25B 1/04* (2021.01)
*C25B 9/67* (2021.01)
*F25J 3/04* (2006.01)

(52) U.S. Cl.
CPC ............ *C01B 13/0288* (2013.01); *C25B 1/04* (2013.01); *C25B 9/67* (2021.01); *C25B 15/085* (2021.01); *F25J 3/04496* (2013.01); *C01B 2210/0004* (2013.01); *C01B 2210/0009* (2013.01); *C01B 2210/005* (2013.01); *C01B 2210/0053* (2013.01)

(58) Field of Classification Search
CPC ........ F25J 1/0075; F25J 1/0221; F25J 1/0228; F25J 1/0234; F25J 1/0237; F25J 1/0238; F25J 1/0245; F25J 1/0262; F25J 1/0264; F25J 1/0288; F25J 3/02; F25J 3/0204; F25J 3/04; F25J 3/04151; F25J 3/04187; F25J 3/04496; F25J 2210/50; F25J 2215/50; F25J 2220/50; F25J 2240/10; F25J 2260/30; F25J 2205/86; F25J 3/04521
See application file for complete search history.

(56) References Cited

U.S. PATENT DOCUMENTS

| | | | | |
|---|---|---|---|---|
| 2014/0109614 A1* | 4/2014 | Tachibana | ............ | F25J 3/04303 62/643 |
| 2022/0349069 A1* | 11/2022 | Golbach | ................ | C25B 1/044 |
| 2023/0212759 A1* | 7/2023 | Kromer | ............... | C01B 13/0277 205/637 |

* cited by examiner

DEVICE AND METHOD FOR PRODUCING HYDROGEN AND BYPRODUCT OXYGEN BY USING GREEN ELECTRICITY ELECTROLYZED WATER

TECHNICAL FIELD

The present disclosure relates to the coupling utilization of producing hydrogen and byproduct oxygen by using green electricity electrolyzed water generated by renewable energy sources such as solar energy and compressed oxygen production in an air separation device, and the utilization of oxygen liquefaction and energy storage, and in particular to a device and a method for producing hydrogen and byproduct oxygen by using green electricity electrolyzed water, belonging to the technical fields of oxygen production and energy storage.

BACKGROUND

Hydrogen energy is expected to change the human energy system because the carbon emission is zero in the release process. The "green hydrogen" produced by electrolysis of water generated by renewable energy such as solar energy is considered as an ideal form of hydrogen energy utilization because there is no carbon emission in the preparation process.

China has the resource characteristics of being short of petroleum and natural gas and relatively rich in coal. Modern coal chemical industry can supplement and partially replace petroleum and natural gas resources. However, coal chemical industry needs a large amount of high-pressure oxygen supplied stably. For example, 4 million tons/year of coal indirect liquefaction oil production project needs at least 1 million cubic meters/hour of high-pressure oxygen. It is the most economical method to produce high-pressure oxygen and liquid oxygen by a cryogenic air separation device at present. Even so, according to Table 2 of NB/T 10429-2020 Energy Efficiency Calculation Method of Air Separation device of Coal Chemical Industry, in the oxygen production and energy consumption value of the reference equivalent unit, the equivalent oxygen production unit consumption with oxygen pressure of 5.0 MPaG is between 0.658 and 0.677 KW·h/m$^3$. How to effectively reduce the unit consumption of oxygen required by the coal chemical industry is an urgent problem to be solved in the current industry.

Green energy, such as solar energy, is greatly influenced by natural environmental factors (season, weather), and the power generation process thereof is characterized by large fluctuation, discontinuity, randomness, uncontrollability and so on, which easily leads to great changes of the load of green electricity electrolyzed water with environmental factors. On the other hand, large-scale byproduct oxygen of producing hydrogen of green electricity electrolyzed water has not been well utilized at present, and a large number of oxygen abandonment phenomena occur.

SUMMARY

The technical problem to be solved by the present disclosure is to provide a device and a method for producing hydrogen and byproduct oxygen by using green electricity electrolyzed water, which can efficiently and safely recycle the byproduct oxygen of producing hydrogen of green electricity electrolyzed water in a manner of coupling with an air separation device and combining with the form of liquid oxygen energy storage, thereby reducing the scale of an air separation device, reducing the air treatment amount of an air compressor, reducing the investment of the air separation device, reducing the operation energy consumption, reducing the overall carbon emission of users, and achieving the purposes of high efficiency and energy conservation. In order to achieve the above purpose, the present disclosure uses the following technology: a device for producing hydrogen and byproduct oxygen by using green electricity electrolyzed water, wherein the device comprises an oxygen purifying system, a heat exchange system, an air separation compression and expansion system, an air separation rectification system and a liquid oxygen storage system which are connected to each other through pipelines, wherein the oxygen purifying system comprises an oxygen self-superheater, an oxygen heater, an oxygen purifier, a first water chilling unit, a second water chilling unit and an oxygen purifier, wherein the oxygen input end of the oxygen self-superheater is connected to the oxygen output end of an electrolyzed water hydrogen production system, the oxygen output end of the oxygen self-superheater is connected to the oxygen input end of an oxygen heater, the oxygen output end of the oxygen heater is connected to the oxygen input end of the oxygen purifier, the purified oxygen output end of the oxygen purifier is connected to the oxygen input ends of the first water chilling unit and the second water chilling unit, the oxygen output ends of the first water chilling unit and the second water chilling unit are connected to the oxygen input end of the oxygen purifier, the purified oxygen at the output end of the oxygen purifier is fed into the heat exchange system through a pipeline, the heat exchange system comprises a heat exchanger and a subcooler, the liquid oxygen storage system comprises a liquid oxygen storage tank, the air separation compression and expansion system comprises a booster for obtaining compressed gas; at least one expander, which comprises a booster end of the expander, a cooler and an expansion end of the expander; a process liquid oxygen pump and a liquid oxygen booster pump, wherein the output end of the liquid oxygen storage system is connected to the input end of the liquid oxygen booster pump, and the output end of the liquid oxygen booster pump is connected to the input end of the process liquid oxygen pump.

Preferably, the heat exchange system and the air separation compression and expansion system are highly coupled with the air separation rectification system, the heat exchanger is provided with at least four forward flow channels and two return flow channels, the four forward flow channels comprise a purified oxygen channel, a pressurized air channel, a pressurized gas channel and a pressurized expansion gas channel, respectively, the two return flow channels comprise a high-pressure oxygen product channel and a return flow gas channel, respectively, the input end of the purified oxygen channel of the heat exchanger is connected to the oxygen output end of the oxygen purifier, the output end of the purified oxygen channel of the heat exchanger is connected to the input end of a valve, the output end of the valve is connected to the hot fluid input end of the subcooler, the liquid oxygen at the hot fluid output end of the subcooler is connected to the input end of the liquid oxygen storage system through the valve and the pipeline, the input end of the pressurized air channel of the heat exchanger introduces clean and dry pressurized air compressed by an air compressor, precooled by a precooling system and purified by a molecular sieve system, the output end of the pressurized air channel of the heat exchanger is connected to the air separation rectification system, the input end of the pressurized gas channel of the heat exchanger is connected to the final output end of the booster, the output end of the pressurized gas channel of the heat exchanger is connected to the input end of a throttle valve; the input end of the pressurized expansion gas channel of the heat exchanger is connected to the output end of an aftercooler at the booster end of the expander, the output end of the pressurized expansion gas channel of the heat exchanger is connected to the input end of the expansion end of the expander, and the output end of the expansion end of the expander is connected to the air separation rectification system; the input end of the high-pressure oxygen product channel of the heat exchanger is connected to the output end of the process liquid oxygen pump, and the output end of the high-pressure oxygen product channel of the heat exchanger is connected to a high-pressure oxygen product output pipeline; the input end of the return flow channel of the heat exchanger is connected to the cold fluid output end of the subcooler, the output end of the return flow channel of the heat exchanger is connected to the subsequent process of the air separation device, the cold fluid input end of the subcooler is connected to the air separation rectification system, the input end of the booster introduces clean and dry pressurized air compressed by the air compressor, precooled by the precooling system and purified by the molecular sieve system, and a segment of the output end of the booster is connected to the input end of the booster end of the expander.

Preferably, the air separation rectification system at least comprises two input channels and two output channels, the two input channels comprise a high-pressure gas throttling input channel and a pressurized gas input channel, respectively; the two output channels comprise a return flow gas output channel and a process liquid oxygen output channel, respectively, the input end of the high-pressure gas throttling input channel is connected to the output end of the throttle valve, and the input end of the pressurized gas input channel is connected to the output end of the pressurized air channel of the heat exchanger; the return flow gas output channel is connected to the cold fluid input end of the subcooler, and the process liquid oxygen output channel is connected to the output end of the valve and is connected to the input end of the process liquid oxygen pump.

Preferably, when the heat exchanger is sufficient of green electricity, the pure oxygen is fed into the heat exchanger for performing heat exchange liquefaction to obtain liquid oxygen, after a part of liquid oxygen is coupled with the liquid oxygen generated by rectification of the air separation rectification system after the liquid oxygen passes through the valve to enter the process liquid oxygen pump for pressurization, the pressurized oxygen is obtained through the heat exchanger and the air separation compression and expansion system, and the rest of liquid oxygen enters the liquid oxygen storage tank after being subcooled by the subcooler, when the heat exchanger is insufficient of green electricity, after the liquid oxygen in the liquid oxygen storage tank is pressurized by the liquid oxygen booster pump, and then enters the process liquid oxygen pump together with the liquid oxygen generated by rectification of the air separation rectification system and all the liquid oxygen obtained after being fed into the heat exchanger with purified oxygen for performing heat exchange liquefaction, the pressurized oxygen is obtained through the heat exchanger and the air separation compression and expansion system, when the green electricity of the heat exchanger does not operate, after the liquid oxygen in the liquid oxygen storage tank is pressurized by the liquid oxygen booster pump, and then enters the process liquid oxygen pump together with the liquid oxygen generated by rectification of the air separation rectification system, the pressurized oxygen is obtained through the heat exchanger and the air separation compression and expansion system.

Preferably, the heat exchanger is a plate-fin heat exchanger.

A use method of the device for producing hydrogen and byproduct oxygen by using green electricity electrolyzed water is provided, comprising the following steps:

step 1: the byproduct oxygen from the device for producing hydrogen of green electricity electrolyzed water enters the oxygen self-superheater, is preheated to a certain temperature, directly enters the oxygen purifier through a pipeline when the temperature meets the requirement of entering the oxygen purifier, and first enters an oxygen heater for heating when the oxygen self-overheating temperature does not meet the requirement of entering the oxygen purifier, and then enters the oxygen purifier after being heated; the heated oxygen undergoes a chemical reaction in the oxygen purifier, converts the impurity $H_2$ in the oxygen into $H_2O$, and converts CO into $CO_2$; after the reaction, the oxygen enters the hot end of the oxygen self-superheater, exchanges heat with the byproduct oxygen from the device for producing hydrogen of electrolyzed water to reduce the temperature, and continues to reduce the temperature after being cooled by a cooling unit, the water condensed at the bottom is directly drained in this process, and the cooled gas enters the oxygen purifier to remove impurities in the oxygen;

step 2: the purified oxygen enters a heat exchanger, the purified oxygen exchanges heat with return flow gas and process flow oxygen in the heat exchanger, so that the purified oxygen is cooled to a liquid state, liquid oxygen is obtained after passing through a valve, when green electricity is sufficient, the part of liquid oxygen is divided into two streams, in which one stream of liquid oxygen merges with the liquid oxygen generated by rectification of an air separation rectification system, enters a process liquid oxygen pump for pressurization, enters the heat exchanger after pressurization, and is vaporized and reheated with forward fluid such as purified oxygen, pressurized gas and pressurized expansion gas to obtain pressurized oxygen, the other stream of liquid oxygen is subcooled by a subcooler and then is stored in a liquid oxygen storage tank for later use, when the green electricity is insufficient, after the liquid oxygen stored in the liquid oxygen storage tank is pressurized by a liquid oxygen booster pump, the liquid oxygen generated by rectification of the air separation rectification system and all the liquid oxygen behind the valve obtained after being fed into the heat exchanger with purified oxygen for performing heat exchange liquefaction are supplemented, all the liquid oxygen enters the process liquid oxygen pump for pressurization together, enters the heat exchanger after pressurization, and is vaporized and reheated with forward fluid such as purified oxygen, pressurized gas and pressurized expansion gas to obtain pressurized oxygen, when the green electricity does not operate, after the liquid oxygen stored in the liquid oxygen storage tank is pressurized by the liquid oxygen booster pump, the liquid oxygen generated by rectification of the air separation rectification system is supplemented, all the liquid oxygen enters the process liquid oxygen pump for pressurization together, enters the heat exchanger after pressurization, and is vaporized and reheated with forward fluid such as purified oxygen, pressurized gas and pressurized expansion gas to obtain pressurized oxygen;

step 3: a part or all of the clean and dry pressurized air compressed by an air compressor, precooled by a precooling system and purified by a molecular sieve system enters a booster for compression, a part of the pressurized air after pressurization enters a booster end of an expander for pressurization, and then enters a cooler after pressurization and then enters a heat exchanger after cooling; the other part of the pressurized air after pressurization directly enters the heat exchanger, the air entering the pressurized expansion gas channel of the heat exchanger is pumped out from the middle of the heat exchanger and then enters the expansion end of the expander for expansion, the air enters the air separation rectification system to participate in rectification after expansion, the air entering the pressurized gas channel of the heat exchanger exchanges heat with the process liquid oxygen of the return flow and the return flow gas from the air separation rectification system, and is pumped out from the bottom of the heat exchanger after cooling, and enters the air separation rectification system to participate in the rectification after throttling and depressurizing, and the clean and dry pressurized air compressed by the air compressor, precooled by the precooling system and purified by the molecular sieve system is also capable of partially entering the pressurized air channel of the heat exchanger, being pumped out from the bottom of the heat exchanger after being cooled by heat exchange, and entering the air separation rectification system to participate in rectification.

Preferably, the active component of the catalyst used in the oxygen purifier is one or more of palladium, platinum, cerium and oxides thereof.

Preferably, the purifying agents used in the oxygen purifier are alumina and molecular sieves; and the filling mode of the catalyst is structured packing.

The present disclosure has the following beneficial effects.

The present disclosure uses the coupling utilization of producing hydrogen and byproduct oxygen by using green electricity electrolyzed water generated by renewable energy sources such as solar energy and compressed oxygen production in an air separation device. When the green electricity is sufficient, the byproduct oxygen of producing hydrogen of electrolyzed water performs heat exchange liquefaction after being purified to obtain liquid oxygen. A part of liquid oxygen is pressurized, vaporized and reheated with the liquid oxygen generated by rectification of the air separation rectification system of the air separation device to obtain pressurized oxygen for users. The rest of liquid oxygen is stored in a liquid oxygen storage tank after being cooled. When the green electricity is insufficient, after the liquid oxygen in the liquid oxygen storage tank is pressurized by the liquid oxygen booster pump, the liquid oxygen enters the process liquid oxygen pump together with the liquid oxygen generated by rectification of the air separation rectification system and all the liquid oxygen obtained after the byproduct oxygen of producing hydrogen of electrolyzed water performs heat exchange liquefaction after being purified, so as to be pressurized, vaporized and reheated and to obtain pressurized oxygen. When the green electricity does not operate, after the liquid oxygen in the liquid oxygen storage tank is pressurized by the liquid oxygen booster pump, the liquid oxygen enters the process liquid oxygen pump together with the liquid oxygen generated by rectification of the air separation rectification system, so as to be pressurized, vaporized and reheated and to obtain pressurized oxygen.

On the one hand, the present disclosure solves the problem of waste of byproduct oxygen of producing hydrogen of green electricity electrolyzed water, and on the other hand, solves the contradiction between instability of byproduct oxygen of producing hydrogen of green electricity electrolyzed water generated discontinuously by photoelectric resources and stability requirement of compressed oxygen production in the air separation device. Through the coupling utilization of the instability and the stability requirement, and in the form of storing energy of liquid oxygen, renewable energy such as photoelectric energy can be utilized to the maximum extent, which not only ensures the oxygen consumption of users, but also reduces the scale of the air separation device, effectively reduces the load of the air compressor, reduces the operation energy consumption of the air separation device, and achieves the purposes of high efficiency, safety and energy conservation. At the same time, the carbon emission is reduced, the win-win situation of enterprise economic benefit and environmental benefit is realized, and the present disclosure has a good promotion prospect.

DETAILED DESCRIPTION OF THE EMBODIMENTS

Figure 1:
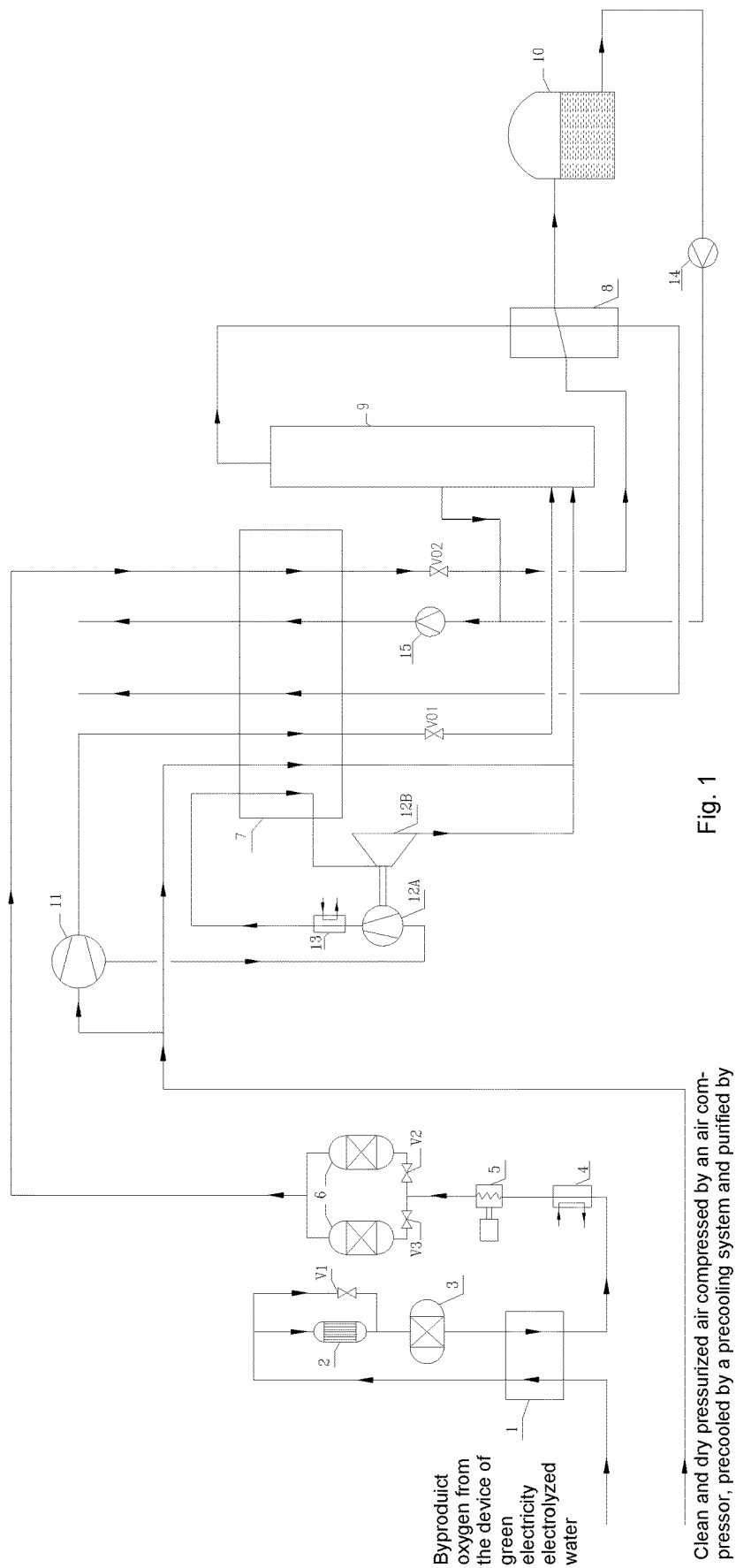
FIG. 1 is a schematic diagram of the present disclosure.

In order to make the technical problems, technical schemes and beneficial effects to be solved by the present disclosure clearer, the present disclosure will be further explained in detail with reference to the attached drawings and specific embodiments. As shown in FIG. 1: a device for producing hydrogen and byproduct oxygen by using green electricity electrolyzed water is provided. The device comprises an oxygen purifying system, a heat exchange system, an air separation compression and expansion system, an air separation rectification system and a liquid oxygen storage system which are connected to each other through pipelines. The oxygen purifying system comprises an oxygen self-superheater 1, an oxygen heater 2, an oxygen purifier 3, a first water chilling unit 4, a second water chilling unit 5 and an oxygen purifier 6. The oxygen input end of the oxygen self-superheater 1 is connected to the oxygen output end of an electrolyzed water hydrogen production system. The oxygen output end of the oxygen self-superheater 1 is connected to the oxygen input end of an oxygen heater 2. The oxygen output end of the oxygen heater 2 is connected to the oxygen input end of the oxygen purifier 3. The purified oxygen output end of the oxygen purifier is connected to the oxygen input ends of the first water chilling unit 4 and the second water chilling unit 5. The oxygen output ends of the first water chilling unit 4 and the second water chilling unit 5 are connected to the oxygen input end of the oxygen purifier 6. The purified oxygen at the output end of the oxygen purifier 6 is fed into the heat exchange system through a pipeline. The heat exchange system comprises a heat exchanger 7 and a subcooler 8. The liquid oxygen storage system comprises a liquid oxygen storage tank 10. The air separation compression and expansion system comprises a booster 11 for obtaining compressed gas; at least one expander, which comprises a booster end 12A of the expander, a cooler 13 and an expansion end 12B of the expander; a process liquid oxygen pump 15 and a liquid oxygen booster pump 14. The output end of the liquid oxygen storage system is connected to the input end of the liquid oxygen booster pump 14, and the output end of the liquid oxygen booster pump 14 is connected to the input end of the process liquid oxygen pump 15. The heat exchange system and the air separation compression and expansion system are highly coupled with the air separation rectification system. The heat exchanger 7 is provided with at least four forward flow channels and two return flow channels. The four forward flow channels comprise a purified oxygen channel, a pressurized air channel, a pressurized gas channel and a pressurized expansion gas channel, respectively. The two return flow channels comprise a high-pressure oxygen product channel and a return flow gas channel, respectively. The input end of the purified oxygen channel of the heat exchanger 7 is connected to the oxygen output end of the oxygen purifier 6. The output end of the purified oxygen channel of the heat exchanger 7 is connected to the input end of a valve V02. The output end of the valve V02 is connected to the hot fluid input end of the subcooler 8. The liquid oxygen at the hot fluid output end of the subcooler 8 is connected to the input end of the liquid oxygen storage system through the valve and the pipeline. The input end of the pressurized air channel of the heat exchanger 7 introduces clean and dry pressurized air compressed by an air compressor, precooled by a precooling system and purified by a molecular sieve system. The output end of the pressurized air channel of the heat exchanger 7 is connected to the air separation rectification system. The input end of the pressurized gas channel of the heat exchanger 7 is connected to the final output end of the booster. The output end of the pressurized gas channel of the heat exchanger 7 is connected to the input end of a throttle valve V01. The input end of the pressurized expansion gas channel of the heat exchanger 7 is connected to the output end of an aftercooler 13 at the booster end 12A of the expander. The output end of the pressurized expansion gas channel of the heat exchanger 7 is connected to the input end of the expansion end 12B of the expander. The output end of the expansion end 12B of the expander is connected to the air separation rectification system. The input end of the high-pressure oxygen product channel of the heat exchanger 7 is connected to the output end of the process liquid oxygen pump 15. The output end of the high-pressure oxygen product channel of the heat exchanger 7 is connected to a high-pressure oxygen product output pipeline. The input end of the return flow channel of the heat exchanger 7 is connected to the cold fluid output end of the subcooler 8. The output end of the return flow channel of the heat exchanger 7 is connected to the subsequent process of the air separation device. The cold fluid input end of the subcooler 8 is connected to the air separation rectification system. The input end of the booster 11 introduces clean and dry pressurized air compressed by the air compressor, precooled by the precooling system and purified by the molecular sieve system. A segment of the output end of the booster 11 is connected to the input end of the booster end 12A of the expander. The air separation rectification system 9 at least comprises two input channels and two output channels. The two input channels comprise a high-pressure gas throttling input channel and a pressurized gas input channel, respectively. The two output channels comprise a return flow gas output channel and a process liquid oxygen output channel, respectively. The input end of the high-pressure gas throttling input channel is connected to the output end of the throttle valve V01. The input end of the pressurized gas input channel is connected to the output end of the pressurized air channel of the heat exchanger 7. The return flow gas output channel is connected to the cold fluid input end of the subcooler 8. The process liquid oxygen output channel is connected to the output end of the valve V02 and is connected to the input end of the process liquid oxygen pump 15. When the heat exchanger 7 is sufficient of green electricity, the pure oxygen is fed into the heat exchanger 7 for performing heat exchange liquefaction to obtain liquid oxygen. After a part of liquid oxygen is coupled with the liquid oxygen generated by rectification of the air separation rectification system 9 after the liquid oxygen passes through the valve V02 to enter the process liquid oxygen pump 15 for pressurization, the pressurized oxygen is obtained through the heat exchanger 7 and the air separation compression and expansion system. The rest of liquid oxygen enters the liquid oxygen storage tank 10 after being subcooled by the subcooler 8. When the heat exchanger 7 is insufficient of green electricity, after the liquid oxygen in the liquid oxygen storage tank 10 is pressurized by the liquid oxygen booster pump 14, and then enters the process liquid oxygen pump 15 together with the liquid oxygen generated by rectification of the air separation rectification system 9 and all the liquid oxygen obtained after being fed into the heat exchanger 7 with purified oxygen for performing heat exchange liquefaction, the pressurized oxygen is obtained through the heat exchanger 7 and the air separation compression and expansion system. When the green electricity of the heat exchanger 7 does not operate, after the liquid oxygen in the liquid oxygen storage tank 10 is pressurized by the liquid oxygen booster pump 14, and then enters the process liquid oxygen pump 15 together with the liquid oxygen generated by rectification of the air separation rectification system 9, the pressurized oxygen is obtained through the heat exchanger 7 and the air separation compression and expansion system. The heat exchanger 7 is a plate-fin heat exchanger.

A use method of the device for producing hydrogen and byproduct oxygen by using green electricity electrolyzed water is provided, comprising the following steps.

Step 1: the byproduct oxygen from the device for producing hydrogen of green electricity electrolyzed water enters the oxygen self-superheater, is preheated to a certain temperature, directly enters the oxygen purifier through a pipeline when the temperature meets the requirement of entering the oxygen purifier, and first enters an oxygen heater for heating when the oxygen self-overheating temperature does not meet the requirement of entering the oxygen purifier, and then enters the oxygen purifier after being heated. The heated oxygen undergoes a chemical reaction in the oxygen purifier, converts the impurity $H_2$ in the oxygen into $H_2O$, and converts CO into $CO_2$. After the reaction, the oxygen enters the hot end of the oxygen self-superheater, exchanges heat with the byproduct oxygen from the device for producing hydrogen of electrolyzed water to reduce the temperature, and continues to reduce the temperature after being cooled by a cooling unit. The water condensed at the bottom is directly drained in this process. The cooled gas enters the oxygen purifier to remove impurities in the oxygen.

Step 2: the purified oxygen enters a heat exchanger. The purified oxygen exchanges heat with return flow gas and process flow oxygen in the heat exchanger, so that the purified oxygen is cooled to a liquid state. Liquid oxygen is obtained after passing through a valve. When green electricity is sufficient, the part of liquid oxygen is divided into two streams, in which one stream of liquid oxygen merges with the liquid oxygen generated by rectification of an air separation rectification system, enters a process liquid oxygen pump for pressurization, enters the heat exchanger after pressurization, and is vaporized and reheated with forward fluid such as purified oxygen, pressurized gas and pressurized expansion gas to obtain pressurized oxygen. The other stream of liquid oxygen is subcooled by a subcooler and then is stored in a liquid oxygen storage tank for later use. When the green electricity is insufficient, after the liquid oxygen stored in the liquid oxygen storage tank is pressurized by a liquid oxygen booster pump, the liquid oxygen generated by rectification of the air separation rectification system and all the liquid oxygen behind the valve V02 obtained after being fed into the heat exchanger 7 with purified oxygen for performing heat exchange liquefaction are supplemented, and all the liquid oxygen enters the process liquid oxygen pump for pressurization together, enters the heat exchanger after pressurization, and is vaporized and reheated with forward fluid such as purified oxygen, pressurized gas and pressurized expansion gas to obtain pressurized oxygen. When the green electricity does not operate, after the liquid oxygen stored in the liquid oxygen storage tank is pressurized by the liquid oxygen booster pump, the liquid oxygen generated by rectification of the air separation rectification system is supplemented, and all the liquid oxygen enters the process liquid oxygen pump for pressurization together, enters the heat exchanger after pressurization, and is vaporized and reheated with forward fluid such as purified oxygen, pressurized gas and pressurized expansion gas to obtain pressurized oxygen.

Step 3: a part or all of the clean and dry pressurized air compressed by an air compressor, precooled by a precooling system and purified by a molecular sieve system enters a booster for compression. A part of the pressurized air after pressurization enters a booster end of an expander for pressurization, and then enters a cooler after pressurization and then enters a heat exchanger after cooling. The other part of the pressurized air after pressurization directly enters the heat exchanger. The air entering the pressurized expansion gas channel of the heat exchanger is pumped out from the middle of the heat exchanger and then enters the expansion end of the expander for expansion. The air enters the air separation rectification system to participate in rectification after expansion. The air entering the pressurized gas channel of the heat exchanger exchanges heat with the process liquid oxygen of the return flow and the return flow gas from the air separation rectification system, and is pumped out from the bottom of the heat exchanger after cooling, and enters the air separation rectification system to participate in the rectification after throttling and depressurizing. The clean and dry pressurized air compressed by the air compressor, precooled by the precooling system and purified by the molecular sieve system is also capable of partially entering the pressurized air channel of the heat exchanger, being pumped out from the bottom of the heat exchanger after being cooled by heat exchange, and entering the air separation rectification system to participate in rectification. The active component of the catalyst used in the oxygen purifier is one or more of palladium, platinum, cerium and oxides thereof. The purifying agents used in the oxygen purifier are alumina and molecular sieves; and the filling mode of the catalyst is structured packing.

Specific Embodiments

As shown in FIG. 1, the byproduct oxygen with the pressure of about 1.0 MPa from the device for producing hydrogen of green electricity electrolyzed water undergoes a chemical reaction in the oxygen purifier 3, converts the impurity $H_2$ in the oxygen into $H_2O$, and converts CO into $CO_2$; and then impurities in the oxygen are removed in the oxygen purifier 6. The content of $CO_2$ and $H_2O$ in the oxygen after leaving the oxygen purifier 6 is not more than 1 ppm. The purified oxygen enters the heat exchanger 7. The purified oxygen exchanges heat with return flow gas and process flow oxygen in the heat exchanger 7, so that the purified oxygen is cooled to a liquid state. Liquid oxygen is obtained after throttling to 0.5 MPa by the valve V02. When green electricity is sufficient, the part of liquid oxygen is divided into two streams, in which one stream of liquid oxygen merges with the liquid oxygen generated by rectification of an air separation rectification system, enters a process liquid oxygen pump 15 to be pressurized to about 5.6 MPa, enters the heat exchanger 7 after pressurization, and undergoes heat exchange and vaporization with forward fluid such as purified oxygen, pressurized gas and pressurized expansion gas. After exiting the heat exchanger 7, the oxygen with a pressure of about 5.5 MPa is obtained to be supplied to users. The other stream of liquid oxygen of 0.5 MPa after throttling by the valve V02 is subcooled to about 81 K by a subcooler and then is stored in a liquid oxygen storage tank for later use. When the green electricity is insufficient, after the liquid oxygen stored in the liquid oxygen storage tank is pressurized to about 0.5 MPa by a liquid oxygen booster pump 14, the liquid oxygen generated by rectification of the air separation rectification system 9 and all the liquid oxygen behind the valve V02 obtained after being fed into the heat exchanger 7 with purified oxygen for performing heat exchange liquefaction are supplemented. All the liquid oxygen enters the process liquid oxygen pump 15 to be pressurized to about 5.6 MPa together, enters the heat exchanger 7 after pressurization, and is vaporized and reheated with forward fluid such as purified oxygen, pressurized gas and pressurized expansion gas. After exiting the heat exchanger 7, the oxygen with a pressure of about 5.5 MPa is obtained. When the green electricity does not operate, after the liquid oxygen stored in the liquid oxygen storage tank is pressurized to about 0.5 MPa by the liquid oxygen booster pump 14, the liquid oxygen generated by rectification of the air separation rectification system 9 is supplemented. All the liquid oxygen enters the process liquid oxygen pump 15 to be pressurized to about 5.6 MPa together, enters the heat exchanger 7 after pressurization, and is vaporized and reheated with forward fluid such as purified oxygen, pressurized gas and pressurized expansion gas. After exiting the heat exchanger 7, the oxygen with a pressure of about 5.5 MPa is obtained. The purpose of pressurizing of the booster pump and the adjustment of the valve V02 is to adjust the pressure, so that the pressure of liquid oxygen from different sources entering the process liquid oxygen pump is consistent. A part of the clean and dry pressurized air compressed by an air compressor, precooled by a precooling system and purified by a molecular sieve system enters a booster for compression. A part of the pressurized air with a pressure of about 3.0 MPa enters a booster end 12A of an expander to be pressurized to about 4.5 MPa, enters a cooler 13 after pressurization, then enters the pressurized expansion gas channel of the heat exchanger 7 after being cooled to about 40° C., and enters the expansion end 12B of the expander to be expanded to about 0.5 MPa after being pumped out from the middle of the heat exchanger 7. The air enters the air separation rectification system to participate in rectification after expansion. The other part of the pressurized air with a pressure of about 7.5 MPa directly enters the pressurized expansion gas channel of the heat exchanger 7, exchanges heat with the process liquid oxygen of the return flow and the return flow gas from the air separation rectification system, and is pumped out from the bottom of the heat exchanger 7 after cooling, and enters the air separation rectification system to participate in the rectification after throttling and depressurizing to about 0.5 MPa. The rest of the clean and dry pressurized air compressed by the air compressor, precooled by the precooling system and purified by the molecular sieve system directly enters the pressurized air channel of the heat exchanger 7, is pumped out from the bottom of the heat exchanger 7 after being cooled to about 100K by heat exchange, and enters the air separation rectification system to participate in rectification.

Figure 2:
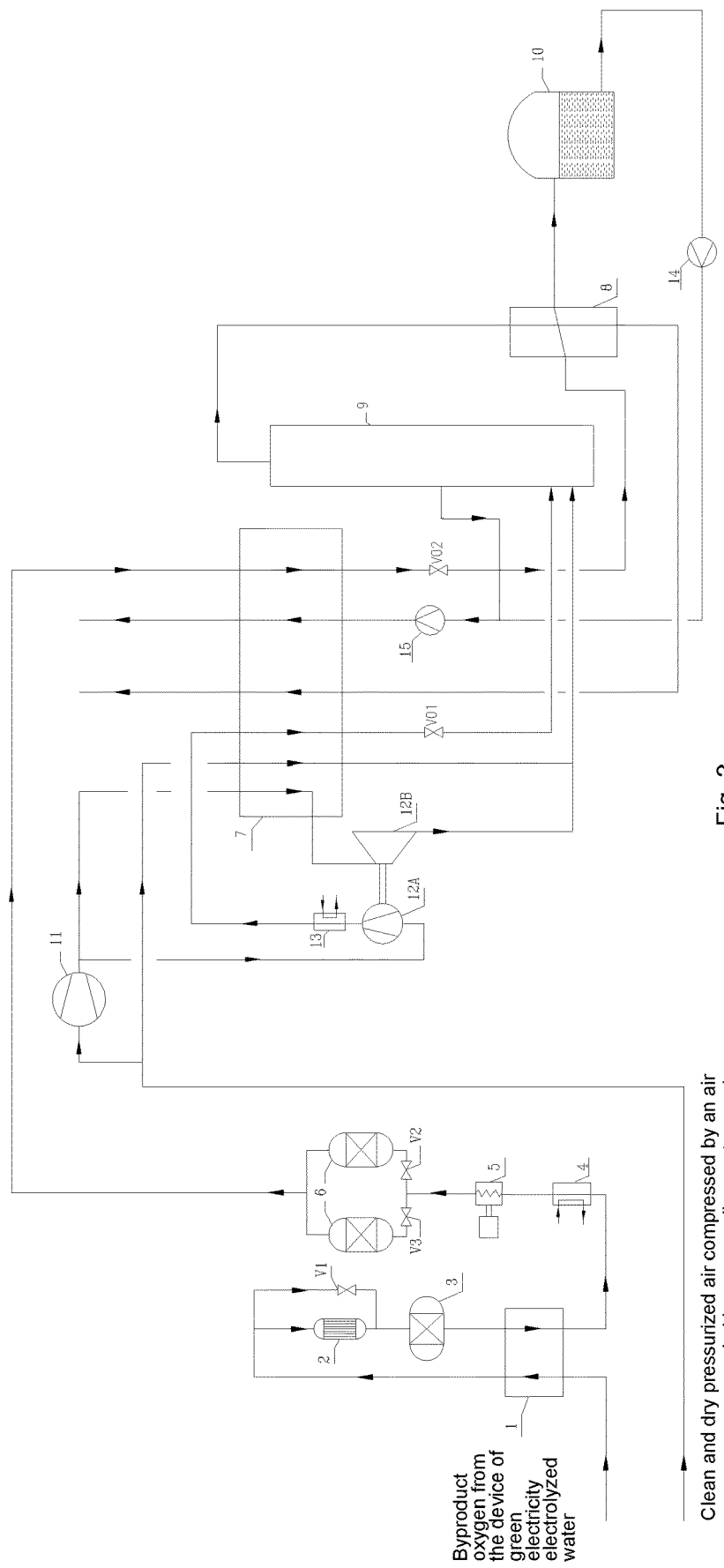
FIG. 2 is a schematic diagram of a modified example of the present disclosure.

FIG. 2 shows that the booster 11 uses a one-part efficient and safe device for recycling the byproduct oxygen of producing hydrogen of green electricity electrolyzed water coupled with the compression oxygen production capacity in the air separation device.

A part of the clean and dry pressurized air compressed by an air compressor, precooled by a precooling system and purified by a molecular sieve system enters a booster 11, is uniformly compressed to about 5.0 MPa, and then exits the booster 11. A part of the pressurized air enters the booster end 12A of the expander and continues to be pressurized to about 7.5 MPa. The pressurized air enters the cooler 13 after pressurization, enters the pressurized gas channel of the heat exchanger 7 after being cooled to about 40° C., exchanges heat with the process liquid oxygen of the return flow and the return flow gas from the air separation rectification system, and is pumped out from the bottom of the heat exchanger 7 after cooling, and enters the air separation rectification system to participate in the rectification after throttling and depressurizing to about 0.5 MPa. The other part of the pressurized air directly enters the pressurized expansion gas channel, and enters the expansion end 12B of the expander to be expanded to about 0.5 MPa after being pumped out from the middle of the heat exchanger 7. The air enters the air separation rectification system to participate in rectification after expansion. The rest of the clean and dry pressurized air compressed by the air compressor, precooled by the precooling system and purified by the molecular sieve system directly enters the pressurized air channel of the heat exchanger 7, is pumped out from the bottom of the heat exchanger 7 after being cooled to about 100K by heat exchange, and enters the air separation rectification system to participate in rectification.

It should be pointed out that the present disclosure is not limited to the above embodiments, and there are many variations due to the various forms of compressed oxygen production processes in conventional air separation devices. For those skilled in the art, several improvements, modifications and variations can be made to the present disclosure without departing from the principle of the present disclosure. These improvements, modifications and variations also fall within the scope of protection of the claims of the present disclosure.

The invention claimed is:

1. A device for producing hydrogen and byproduct oxygen by using green electricity electrolyzed water, wherein the device comprises an oxygen purifying system, a heat exchange system, an air separation compression and expansion system, an air separation rectification system and a liquid oxygen storage system which are connected to each other through pipelines, wherein the oxygen purifying system comprises an oxygen self-superheater, an oxygen heater, an oxygen purifier, a first water chilling unit, and a second water chilling unit, wherein an oxygen input end of the oxygen self-superheater is connected to an oxygen output end of an electrolyzed water hydrogen production system, an oxygen output end of the oxygen self-superheater is connected to an oxygen input end of an oxygen heater, an oxygen output end of the oxygen heater is connected to an oxygen input end of the oxygen purifier, a purified oxygen output end of the oxygen purifier is connected to oxygen input ends of the first water chilling unit and the second water chilling unit, oxygen output ends of the first water chilling unit and the second water chilling unit are connected to the oxygen input end of the oxygen purifier, purified oxygen at the purified oxygen output end of the oxygen purifier is fed into the heat exchange system through a pipeline, the heat exchange system comprises a heat exchanger and a subcooler, the liquid oxygen storage system comprises a liquid oxygen storage tank, the air separation compression and expansion system comprises a booster for obtaining compressed gas; at least one expander, which comprises a booster end of the expander, a cooler and an expansion end of the expander; a process liquid oxygen pump and a liquid oxygen booster pump, wherein an output end of the liquid oxygen storage system is connected to an input end of the liquid oxygen booster pump, and an output end of the liquid oxygen booster pump is connected to an input end of the process liquid oxygen pump.

* * * * *